(12) United States Patent
Zhang

(10) Patent No.: US 12,168,172 B2
(45) Date of Patent: Dec. 17, 2024

(54) LAG DETECTION METHOD AND APPARATUS, DEVICE, AND READABLE STORAGE MEDIUM

(71) Applicant: TENCENT TECHNOLOGY (SHENZHEN) COMPANY LIMITED, Shenzhen (CN)

(72) Inventor: Shenglong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 234 days.

(21) Appl. No.: 17/719,753

(22) Filed: Apr. 13, 2022

(65) Prior Publication Data
US 2022/0233957 A1    Jul. 28, 2022

Related U.S. Application Data

(63) Continuation of application No. PCT/CN2021/092621, filed on May 10, 2021.

(30) Foreign Application Priority Data

Jun. 3, 2020  (CN) .................. 202010494870.4

(51) Int. Cl.
G06T 7/00      (2017.01)
A63F 13/52     (2014.01)
(Continued)

(52) U.S. Cl.
CPC .............. A63F 13/52 (2014.09); G06T 7/254 (2017.01); H04N 21/4334 (2013.01);
(Continued)

(58) Field of Classification Search
CPC . G06V 10/462; A63F 13/52; A63F 2300/203; G06T 7/254; G06T 2207/20224; H04N 21/4781
See application file for complete search history.

(56) References Cited

U.S. PATENT DOCUMENTS

2016/0246430 A1   8/2016   Wang et al.
2018/0183815 A1   6/2018   Enfinger

FOREIGN PATENT DOCUMENTS

CM   110599525 A        12/2019
CN   105761255 A    *   7/2016    .......... G06V 10/462
(Continued)

OTHER PUBLICATIONS

Yigang Zhou, "Similar Image Recognition Based on Perceptual Hash Algorithm", Mike Tech Blog, dated Apr. 8, 2016, Retrieved from teh Internet: URL https://yigang.life/perceptual-hash-algorithm. 18 pages.*

(Continued)

Primary Examiner — Lawrence S Galka
(74) Attorney, Agent, or Firm — ANOVA LAW GROUP PLLC

(57) ABSTRACT

A lag detection method includes: obtaining a first image frame and a second image frame in a running process of an application; converting a difference image between the first image frame and the second image frame into a grayscale image; determining, according to grayscale values of pixels in the grayscale image, whether a lag occurs from the first image frame to the second image frame in the running process of the application. A difference image between two image frames in a process video is converted into a grayscale image, and a lag situation between the two image frames is determined by using the grayscale image, so that the lag (Continued)

situation can be determined without the need of obtaining an FPS value in a running process of a terminal application.

20 Claims, 9 Drawing Sheets

(51) Int. Cl.
  *G06K 9/46* (2006.01)
  *G06T 7/254* (2017.01)
  *H04N 21/433* (2011.01)
  *H04N 21/478* (2011.01)
(52) U.S. Cl.
  CPC .... *H04N 21/4781* (2013.01); *A63F 2300/203* (2013.01); *G06T 2207/20224* (2013.01)

(56) References Cited

FOREIGN PATENT DOCUMENTS

| CN | 105913088 A | 8/2016 |
| CN | 106375755 A | 2/2017 |
| CN | 106803863 A | 6/2017 |
| CN | 107451066 A | 12/2017 |
| CN | 107734120 A | 2/2018 |
| CN | 110475124 A | 11/2019 |
| CN | 111654756 A | 9/2020 |
| EP | 3076674 A | 10/2016 |
| JP | 200290471 A | 3/2002 |
| KR | 20120105735 A | 9/2012 |
| KR | 20170107782 A | 9/2017 |

OTHER PUBLICATIONS

The State Intellectual Property Office of the People's Republic of China (SIPO) Office Action 1 for for 202010494870.4 Jan. 29, 2021 12 Pages (including translation).
The World Intellectual Property Organization (WIPO) International Search Report for PCT/CN2021/092621 Jun. 30, 2021 6 Pages (including translation).
Perfdog Assistant, "Do APPs and games need to pay attention to Jank stuttering and stuttering rate?" PerfDog Community, Jun. 18, 2020, Retrieved from the Internet: URL: https://bbs.perfdog.qq.com/article-detail.html?id=6. 16 pages.
Jerrysing, "Calculate the similarity summary of two images," CSDN Blog, Sep. 17, 2018, Retrieved from the Internet: URL: https://blog.csdn.net/u010977034/article/details/82733137. 10 pages.
Yigang Zhou, "Similar Image Recognition Based on Perceptual Hash Algorithm," MikeTech Blog, Apr. 8, 2016, Retrieved from the Internet: URL: https://yigang.life/perceptual-hash-algorithm. 18 pages.
Indian Patent Office Examination report for Application No. 202237025271 Jan. 30, 2023 6 pages.
The Japan Patent Office (JPO) Notification of Reasons for Refusal for Application No. 2022-539027 and Translation Mar. 2, 2022 4 Pages.
Korean Intellectual Property Office (KIPO) Office Action 1 for 2022-7012382 Aug. 5, 2024 13 Pages (including translation).

* cited by examiner

LAG DETECTION METHOD AND APPARATUS, DEVICE, AND READABLE STORAGE MEDIUM

CROSS-REFERENCES TO RELATED APPLICATIONS

This application is a continuation application of PCT Patent Application No. PCT/CN2021/092621, entitled "LAGGING DETECTION METHOD AND APPARATUS, AND DEVICE AND READABLE STORAGE MEDIUM" and filed on May 10, 2021, which claims priority to Chinese Patent Application No. 202010494870.4, entitled "LAG DETECTION METHOD AND APPARATUS, DEVICE, AND READABLE STORAGE MEDIUM" and filed with the China Intellectual Property Administration on Jun. 3, 2020, the entire contents of both of which are incorporated herein by reference.

FIELD OF THE TECHNOLOGY

Embodiments of this application relate to the field of lag detection, and in particular, to a lag detection method and apparatus, a device, and a readable storage medium.

BACKGROUND OF THE DISCLOSURE

Lag detection is a process of detecting a lag problem caused by transmission delay and operation delay during video playback or a game. The lag problem usually causes a sense of visual incoherence for users, which leads to relatively poor visual experience during video playback or a game.

In the related art, whether there is a lag is determined through frames per second (FPS), or is determined through calculation according to a graphics card rendering interval. When the FPS is lower than a threshold, or the graphics card rendering interval is higher than a threshold, it is determined that a lag has occurred.

However, in some real-time video display scenarios, a video stream transmitted to a terminal for decoding and playback has a lag effect due to a lag generated by a cloud device itself, and a lag situation cannot be detected by using the foregoing method during lag detection, which leads to relatively low accuracy of lag detection.

SUMMARY

Embodiments of this application provide a lag detection method and apparatus, a device, and a readable storage medium, which can improve the accuracy of lag detection. The technical solutions are as follows.

According to one aspect, a lag detection method is provided, performed by a computing device, the method including: obtaining a first image frame and a second image frame displayed in a running process of an application in a user terminal, the first image frame and the second image frame being image frames corresponding to a visual displayed in the running process of the application; obtaining a difference image between the first image frame and the second image frame, the difference image representing difference degrees between corresponding pixels in the first image frame and the second image frame; converting the difference image into a grayscale image, the grayscale image comprising a plurality of pixels; and determining, according to grayscale values of the pixels in the grayscale image, whether a lag occurs within display duration from the first image frame to the second image frame in the running process of the application.

According to another aspect, a lag detection apparatus is provided, including: an obtaining module, configured to obtain a first image frame and a second image frame displayed in a running process of an application in a user terminal, the first image frame and the second image frame being image frames corresponding to a visual displayed in the running process of the application; the obtaining module being further configured to obtain a difference image between the first image frame and the second image frame, the difference image representing difference degrees between corresponding pixels in the first image frame and the second image frame; a conversion module, configured to convert the difference image into a grayscale image, the grayscale image including a plurality of pixels; and a determination module, configured to determine, according to grayscale values of the pixels in the grayscale image, whether a lag occurs from the first image frame to the second image frame in the running process of the application.

According to another aspect, a computer device is provided, including a processor and a memory, the memory storing at least one instruction, at least one program, a code set, or an instruction set, the at least one instruction, the at least one program, the code set, or the instruction set being loaded by the processor, to perform operations including: obtaining a first image frame and a second image frame displayed in a running process of an application in a user terminal, the first image frame and the second image frame being image frames corresponding to a visual displayed in the running process of the application; obtaining a difference image between the first image frame and the second image frame, the difference image representing difference degrees between corresponding pixels in the first image frame and the second image frame; converting the difference image into a grayscale image, the grayscale image comprising a plurality of pixels; and determining, according to grayscale values of the pixels in the grayscale image, whether a lag occurs within display duration from the first image frame to the second image frame in the running process of the application.

According to another aspect, a non-transitory computer-readable storage medium is provided, storing at least one instruction, at least one program, a code set or an instruction set, the at least one instruction, the at least one program, the code set or the instruction set being loaded and executed by a processor to implement the lag detection method provided in the foregoing embodiments.

According to another aspect, a computer program product is provided, the computer program product, when run on a computer, causing the computer to perform the lag detection method according to the embodiments of this application.

The technical solutions provided in the embodiments of this application produce at least the following beneficial effects:

A difference image between two image frames in a process video is converted into a grayscale image, and a lag situation between the two image frames is determined by using the grayscale image, so that the lag situation can be determined without the need of obtaining an FPS value in a running process of a terminal application. To be specific, a lag situation may be accurately determined for a cloud application such as a cloud game, which improves the accuracy of lag detection and the adaptability of the detection process.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

Figure 1A:
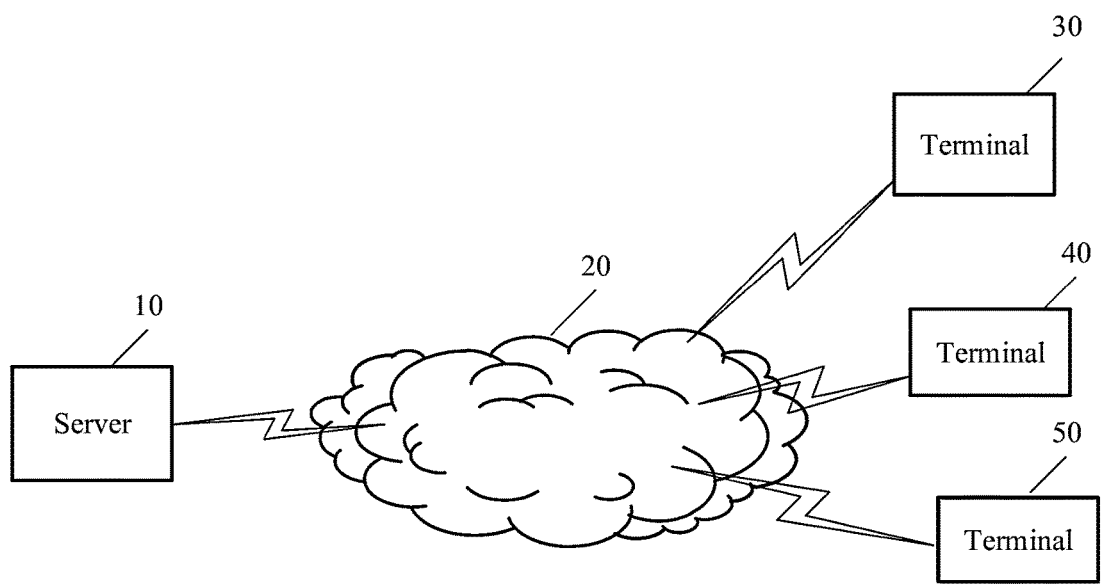
FIG. 1A is a schematic diagram of an example of a network structure applicable to the technical solutions of this application.

To make objectives, technical solutions, and advantages of this application clearer, the following further describes implementations of this application in detail with reference to the accompanying drawings.

First, terms involved in the embodiments of this application are briefly introduced.

A cloud technology refers to a hosting technology that unifies a series of resources such as hardware, software and network in a wide area network or local area network to realize calculation, storage, processing, and sharing of data, and is a general term of the network technology, information technology, integration technology, platform management technology, and application model technology based on cloud computing business model applications, which may form a resource pool to be used flexibly and conveniently as required. The cloud computing technology will become an important support. Background services of a technology network system need a lot of computing and storage resources, such as video websites, picture websites, and more portals. With the high development and application of the Internet industry, every item may have its own identification mark in the future, which needs to be transmitted to a background system for logical processing. Different levels of data are processed separately, and all kinds of industry data need strong system backing support, which can only be realized through cloud computing.

Cloud game: it refers to a game in which the game runs in a cloud server device, and is transmitted to a user terminal through network after a game scene rendered by the cloud device is encoded, and then the user terminal decodes the encoded file and renders the file to a display screen for display. Therefore, a user can complete a game interaction process only by establishing communication network connection with the cloud without the need of installing the game locally.

That is, an organizational structure of the cloud game includes a terminal and a cloud server. The terminal is configured to receive a control operation of the user during a game, and transmit a control instruction corresponding to the control operation to the cloud server, and the cloud server is configured to control a game progress, and transmit a video stream during the game to the terminal for playback. That is, in the organizational structure of the cloud game, the terminal is mainly responsible for playing back a game video during the game and receiving the control operation. The cloud server is mainly responsible for the operation and video generation during the game. Game software is installed in the cloud server without being installed in the terminal. After establishing communication connection with the cloud server, the terminal may control the cloud game to run in the cloud server.

Lag: It refers to a sense of visual incoherence generated when the terminal plays back a video or runs a game. The lag situation is usually caused by operation delay of the terminal or network delay. In the related art, the generation of a lag situation is determined by using FPS. However, in a cloud game scenario, when a video stream transmitted by a cloud device to a terminal for decoding and playback has a lag effect due to a lag generated by a cloud device, a lag situation is still generated even if no fault occurs to FPS of the terminal, and the lag situation generated in the scenario cannot be detected by using the FPS.

Grayscale image: It refers to an image in which white and black are divided into different levels according to a logarithmic relationship, which is referred to as the gray scale. In the embodiments of this application, grayscale processing is performed on a color image, to obtain a grayscale image. A red green and blue (RGB) value of each pixel in the color image is converted into a grayscale value according to a formula, to obtain the grayscale image corresponding to the color image. Visually, the grayscale image is a black and white image. Schematically, for the formula used for converting the RGB value into the grayscale value, reference may be made to the following formula 1:

$$\text{grayscale value} = R*0.3 + G*0.59 + B*0.11 \qquad \text{Formula 1}$$

R indicates a value of a red channel, G indicates a value of a green channel, and B indicates a value of a blue channel.

In combination with the foregoing term introduction, an application scenario involved in the embodiments of this application is first introduced. FIG. 1A is a schematic diagram of a network system applicable to the technical solutions of this application. As shown in FIG. 1A, the system includes a server 10, a network 20, and terminals 30 to 50.

The server 10 may be a normal server, or may be a cloud server, may be a single server, or may be a server cluster formed by a plurality of servers.

The network 20 may be a network formed by direct links, or may be a mesh network formed by a plurality of links. The links in the network 20 may include a wired link, a wireless link, and a combination thereof. The network 20 may use a private communication protocol, or may use any existing communication protocol.

The terminals 30 to 50 (also referred to as user terminals) are terminals implemented by any computing device used by users. The terminals 30 to 50 may include a PC, a notebook computer, a tablet computer, a smart phone, and the like. A large quantity of terminals may be stored in the network. Schematically, only three terminals are shown in FIG. 1A.

An application scenario of a lag detection method provided in the embodiments of this application includes at least one of the following scenarios:

First, in a running process of a game, screen recording is performed on the running process of the game, to obtain a game process video, a similarity between adjacent image frames in the game process video is determined, and whether a lag occurs in the game process video is determined according to the similarity between the adjacent image frames, so as to determine whether a lag occurs in the game process, and restore the lag situation promptly when a lag occurs in the game process.

The foregoing game may be implemented as a normal game, or may be implemented as a cloud game. This is not limited in the embodiments of this application. The game may be implemented as the following: a first person shooting (FPS) game, a multiplayer online battle arena game (MOBA), a multiplayer gun battle survival game, a shooting game of a battle royale type, and the like.

In this case, the server 10 may be a game server, game applications may run in the terminals 30 to 50, and the terminals 30 to 50 communicate with the server 10 through the network 20, to exchange game data.

In an embodiment, in a running process of a cloud game, operation is performed by using a cloud server, and a video stream obtained after operation is transmitted to a terminal for playback, that is, the terminal is mainly responsible for video playback in the running process of the cloud game. Therefore, there is no high requirements on the computing capability of the terminal in the running process of the cloud game, and a lag situation is also not easy to occur in a playback process of a game video. However, the operation amount of the cloud server is large in the running process of the game, which is easy to generate a lag situation. In this case, the video stream generated by the cloud server is a video stream with a lag situation, and there is no lag caused by the terminal in a process of the terminal playing back the video stream, that is, the lag situation in the running process of the cloud game cannot be accurately detected by using the FPS. In the embodiments of this application, image frames are obtained from the process video in the running process of the cloud game, and whether a lag occurs in the running process of the cloud game is detected according to a difference degree between the image frames, which improves the accuracy of lag detection.

Figure 1B:
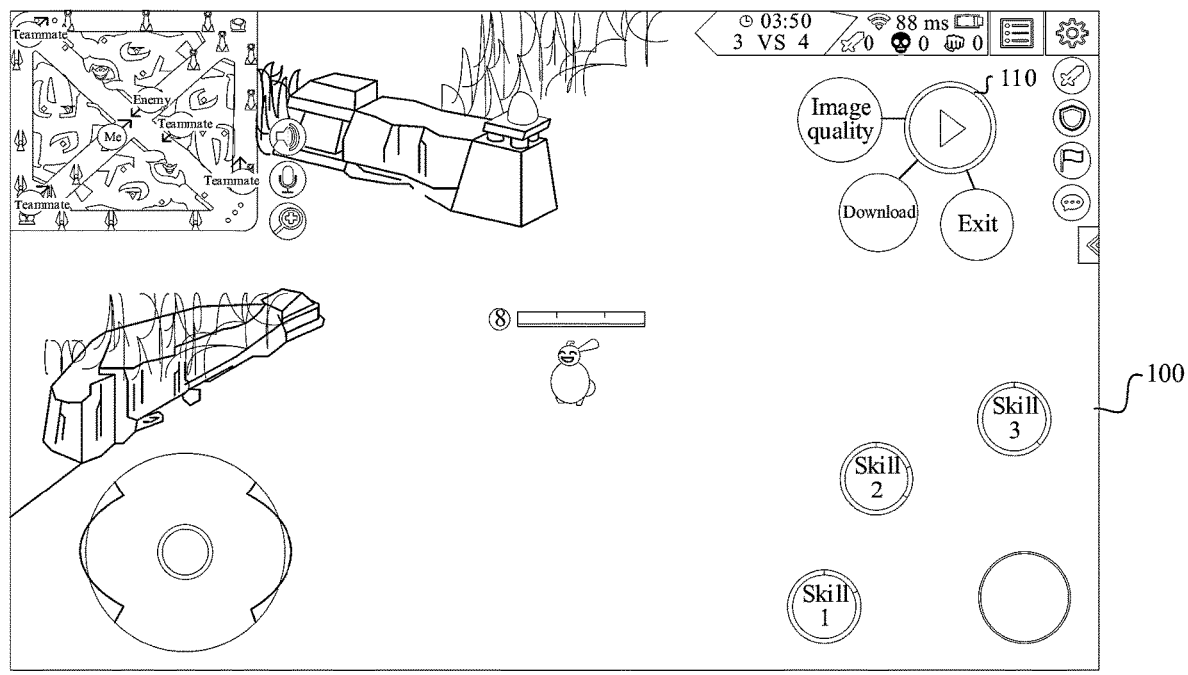
FIG. 1B is a schematic diagram of displaying a lag detection control in a game running interface according to an exemplary embodiment of this application.

Schematically, referring to FIG. 1, a lag detection control 110 is displayed in a game running interface 100, which is configured to indicate that a current terminal is recording a game process, and whether a lag occurs in the game is detected according to a recorded game process video.

Second, in a video messaging application (such as an instant messaging application, an online video application, and the like), a video messaging process of a video receiver is recorded, to obtain a messaging process video, a similarity between adjacent image frames in the messaging process video is determined, and whether a lag occurs in the video messaging process is determined according to the similarity between the two adjacent image frames, so as to determine whether a lag occurs in the video messaging process, and further prompt a lag situation to a user when there is a lag in the video messaging process, and provide a restoring advice.

In this case, the server 10 may be a video messaging server, video messaging applications may run in the terminals 30 to 50, and the terminals 30 to 50 communicate with the server 10 through the network 20, to obtain video data from the server 10 or other terminals.

Third, in a navigation process of a navigation application, screen recording is performed on the navigation process, to obtain a navigation process video, a similarity between adjacent image frames in the navigation process video is determined, and whether a lag occurs in the navigation process video is determined according to the similarity between the two adjacent image frames, so as to determine whether a lag occurs in the navigation process, and restore the lag situation when a lag occurs in the navigation process, avoiding the navigation deviating from the route.

In this case, the server 10 may be a navigation server, navigation applications may run in the terminals 30 to 50, and the terminals 30 to 50 communicate with the server 10 through the network 20, to obtain navigation data from the server 10.

The foregoing application scenarios are merely schematic examples in the embodiments of this application. The lag detection method provided in the embodiments of this application may be applied to any scenario in which lag detection is performed by recording a video and by using a similarity between image frames. This is not limited in the embodiments of this application.

The lag detection method provided in the embodiments of this application may be implemented by using a terminal, may be implemented by using a server, or may be implemented by collaborating the terminal and the server. The terminal includes at least one of a smart phone, a tablet computer, a portable laptop computer, a desktop computer, a smart speaker, and a smart portable device. The server may be a physical server, or may be a cloud server providing cloud computing services, and the server may be implemented as one server, or may be a server cluster or a distributed system formed by a plurality of servers. When the terminal and the server collaboratively implement solutions provided in the embodiments of this application, the terminal and the server may be directly or indirectly connected in a wired or wireless communication manner. This is not limited in the embodiments of this application.

Figure 2:
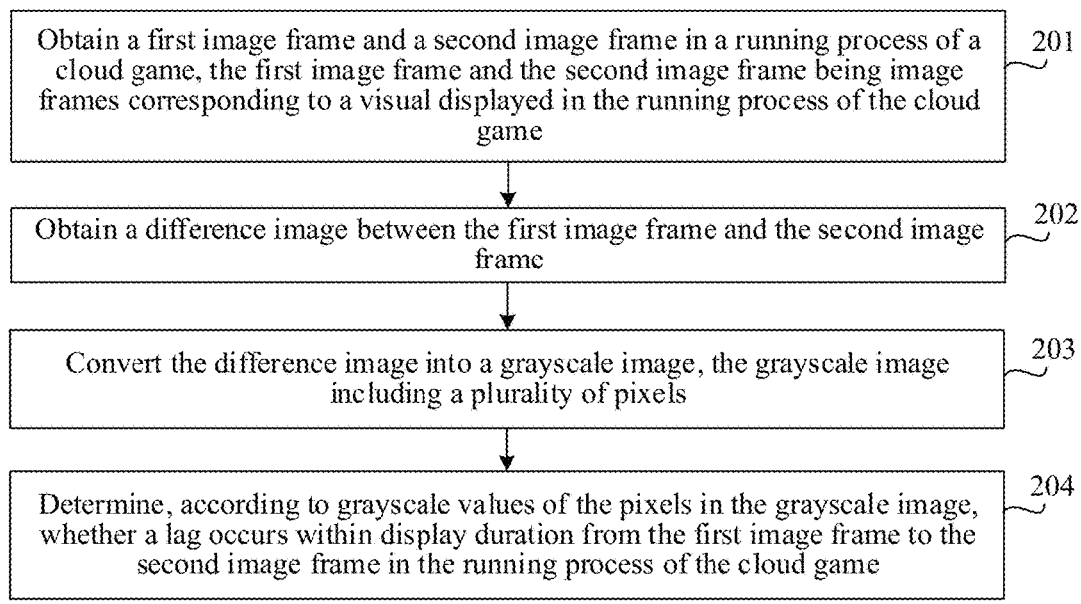
FIG. 2 is a flowchart of a lag detection method according to an exemplary embodiment of this application.

The lag detection method provided in the embodiments of this application is described in combination of the foregoing term introduction and scenario introduction. FIG. 2 is a flowchart of a lag detection method according to an exemplary embodiment of this application. An example in which the method is applied to a server is used for description. As shown in FIG. 2, the method includes:

Step 201: Obtain a first image frame and a second image frame displayed in a running process of an application in a user terminal, the first image frame and the second image frame being image frames corresponding to a visual displayed in the running process of the application.

In the embodiments, the application is one of the following: a cloud game application, a real-time video application, a navigation application, and another application for displaying a dynamic image through real-time network data transmission.

In an embodiment, a display interval between the first image frame and the second image frame is less than a duration threshold, that is, the display interval between the first image frame and the second image frame is less than preset duration. For example, the display interval between the first image frame and the second image frame is less than 0.3 s.

In an embodiment, the first image frame and the second image frame may be obtained by performing screen shooting on a visual displayed by a terminal, or may be obtained by recording a process video in a running process of an application of the terminal, thereby obtaining the first image frame and the second image frame from the process video.

In the embodiments of this application, an example in which the process video is obtained by performing video recording in the running process of the application, and the first image frame and the second image frame are obtained from the process video is used for description.

In an embodiment, the application may be at least one of various applications such as a terminal game, an instant messaging application, a navigation application, a multimedia playing application, and a financial application.

In the embodiments of this application, a cloud game is used as an example for description, that is, a process video is recorded in a running process of the cloud game. The process video is recorded in the running process of the cloud game, that is, process video recording in a game application includes any one of the following two cases:

First, after a user logs in to a cloud game, or the cloud game is started, recording of a running process of the cloud game begins, and interface content of a game preparing stage, a game running stage, a game ending stage, or other functions used by the user in the cloud game are all recorded in the process video.

In an embodiment, in the cloud game, computing at the game preparing stage, the game running stage, and the game ending stage are all completed by a cloud server. The cloud server needs to perform a large amount of computing at the game preparing stage and the game ending stage other than the game running stage. Configuration parameters of a player at the game running stage needs to be obtained in the game preparing stage, and a game result of the player at the game running stage needs to be obtained at the game ending stage. Therefore, image frames are obtained in the game preparing stage, and whether a lag occurs at the game preparing stage is detected, so as to avoid low obtaining accuracy of the configuration parameters. Image frames are obtained at the game ending stage, and whether a lag occurs at the game ending stage is detected, so as to avoid an obtaining error of game result data.

Second, when a user logs in to a cloud game, and triggers an operation of starting the game, recording of a running process of the cloud game begins. A game running stage refers to a stage at which the user controls a game process through operations.

In an embodiment, a cloud server needs to perform a large amount of logical operation and graphical operation at the game running stage, and consequently, a lag situation is easy to occur. Image frames at the game running stage are obtained, and lag detection at the game running stage is performed by using the image frames, thereby avoiding that game experience is affected due to a lag situation continuously occurs in the game process.

In an embodiment, by using a game application as an example, the lag detection method provided in the embodiments of this application may be applied to a game, and may be alternatively applied to a game monitoring platform. The game monitoring platform is a platform independent of the game application, and after obtaining a process video by performing process video recording in the game process, the platform performs lag detection. In an embodiment, the lag detection method may be alternatively applied in an independent lag detection application. When a user uses a terminal device, the lag detection application is started as required, and after the lag detection application is started, screen recording begins according to a running situation of an application procedure, and a process video is recorded for lag detection.

In an embodiment, the first image frame and the second image frame may be obtained by performing screen shooting on a visual displayed by a terminal, or may be obtained by recording a process video in a running process of a cloud game of the terminal, thereby obtaining the first image frame and the second image frame from the process video.

In the embodiments of this application, an example in which the process video is obtained by performing video recording in the running process of the cloud game, and the first image frame and the second image frame are obtained from the process video is used for description.

In an embodiment, a selection manner of the first image frame and the second image frame includes at least one of the following manners:

First, the first image frame and the second image frame are two adjacent frames in the process video. To be specific, acquisition is performed from the first frame of the process video, the first frame of the process video is used as the first image frame, the second frame is used as the second image frame, and lag detection is performed between the first frame and the second frame. Then, the second frame is used as the first image frame, the third frame is used as the second image frame, and lag detection is performed between the second frame and the third frame. The rest is deduced by analogy.

In an embodiment, when lag detection is performed by using adjacent frames, lag detection is performed on the process video frame by frame, so that a detected lag situation is more accurate.

Second, the first image frame and the second image frame are two image frames spaced n frames apart in the process video, n being a positive integer.

For example, when n is 3, the first frame is used as the first image frame, the fourth frame is used as the second image frame, and lag detection is performed between the first frame and the fourth frame. In an embodiment, when lag detection between the first image frame and the second image frame is completed, a next frame of the first image frame is used as the first image frame for performing lag detection again. Alternatively, the second image frame is used as the first image frame for performing lag detection again. Alternatively, an image frame spaced apart m frames is used as the first image frame for performing lag detection again, where m is a positive integer.

Third, the first image frame and the second image frame are two adjacent key frames in the process video. To be specific, acquisition is performed from the first key frame in the process video, the first key frame of the process video is used as the first image frame, the second key frame is used as the second image frame, and lag detection is performed between the first key frame and the second key frame. Then, the second key frame is used as the first image frame, the third key frame is used as the second image frame, and lag detection is performed between the second key frame and the third key frame. The rest is deduced by analogy.

An image frame is the smallest unit of a single image in a video, and is represented by using a grid or a grid marker on the timeline. A key frame (also referred to an I frame) may be understood as a turning frame of actions in the video, and refers to a frame where a key action of a role, a moving object, or a change is located. An image frame between two key frames is referred to as a transition frame or an intermediate frame (a P frame or a B frame).

A determination manner of the first image frame and the second image frame is a schematic example. In the embodiments of this application, the first image frame and the second image frame may alternatively be determined in other manners. This is not limited in the embodiments of this application.

Step 202: Obtain a difference image between the first image frame and the second image frame.

In an embodiment, the difference image represents difference degrees between corresponding pixels in the first image frame and the second image frame. In this case, the difference image is expressed in a color form. For example, the difference image is an RGB image. Each pixel corresponds to an RGB value, and grayscale processing is performed on the difference image, to obtain a grayscale image corresponding to the difference image.

In an embodiment, a first pixel value matrix corresponding to the first image frame and a second pixel value matrix corresponding to the second image frame are determined first. During establishment of the first pixel value matrix, an arrangement manner of pixels in the first image frame is determined first, and pixel values of the pixels are then determined, so that rows and columns of the matrix are determined according to the arrangement manner of the pixels during establishment of the first pixel value matrix. For example, if the first image frame has 300*500 pixels, the first pixel value matrix includes 300 columns and 500 rows. A value of each element in the first pixel value matrix corresponds to a pixel value of a corresponding pixel in the first image frame. For example, if a pixel value of an element at the $120^{th}$ column and the $20^{th}$ row in the first image frame is (50,50,50), a value of an element at the $120^{th}$ column and the $20^{th}$ row in the first pixel value matrix is (50,50,50). In an embodiment, for a determination manner of the second pixel value matrix, reference may be made to the determination manner of the first pixel value matrix, and sizes of the first pixel value matrix and the second pixel value matrix are the same.

Subtraction is performed on the first pixel value matrix and the second pixel value matrix, to obtain the difference image. The difference image is expressed in a form of a difference matrix. The difference matrix includes pixel difference values corresponding to the difference degrees between the pixels. Because the first pixel value matrix and the second pixel value matrix are expressed in a form of an RGB pixel value, during the subtraction operation, subtraction is performed respectively on R values, G values, and B values of corresponding pixel positions, to obtain the difference matrix.

Step 203: Convert the difference image into a grayscale image, the grayscale image including a plurality of pixels.

In an embodiment, each pixel of the a plurality of pixels corresponds to a grayscale value. To be specific, pixel difference values in the difference matrix corresponding to the difference image are obtained, and the pixel difference values are then converted into grayscale values, to obtain the grayscale image, the grayscale image being represented by a grayscale value matrix. For a single pixel difference value, an R value, a G value, and a B value in the pixel difference value are respectively substituted into a grayscale value conversion algorithm provided in the foregoing formula 1, to obtain a grayscale value.

In an embodiment, subtraction is performed on the matrices corresponding to the two image frames by using a subtract interface in a cross-platform computer visual library (OpenCV), and a difference matrix obtained through subtraction is converted into a grayscale value matrix by using a cvtColor interface of OpenCV. Relatively mature interfaces: the subtract interface and the cvtColor interface in OpenCV are used, and only simple matrix operation is involved. Therefore, it takes about 0.01 s to process two 2340*1080 images in the foregoing manner, which has a high computing speed.

In an embodiment, when subtraction is performed on pixel value matrices of the first image frame and the second image frame, the pixel value matrices of the first image frame and the second image frame are determined first. The pixel value matrix of the first image frame is used as an example for description. A size of the pixel value matrix corresponds to a quantity of pixels of the first image frame, and each element in the pixel value matrix is an RGB value of a corresponding pixel in the first image frame. Similarly, each element in the pixel value matrix of the second image frame is an RGB value of a corresponding pixel in the second image frame. When subtraction is performed on the pixel value matrices of the first image frame and the second image frame, subtraction is performed on pixel values of corresponding positions in the two pixel value matrices.

In an embodiment, when there is no difference between two frames of images, a full black image is drawn by using a matrix obtained through subtraction. However, for images between which a difference can be told by naked eyes, bright points appear in a difference region in an image drawn after subtraction, and a large difference leads to a brighter point. However, because a pixel value in the black image does not have to be (0,0,0), but is usually a value of which values of three channels are all relatively small such as (1,1,1) or (2,2,2), that a pixel value is (0,0,0) cannot be used as a condition for determining whether there is a difference that can be seen by naked eyes between two frames of images.

Figure 3:
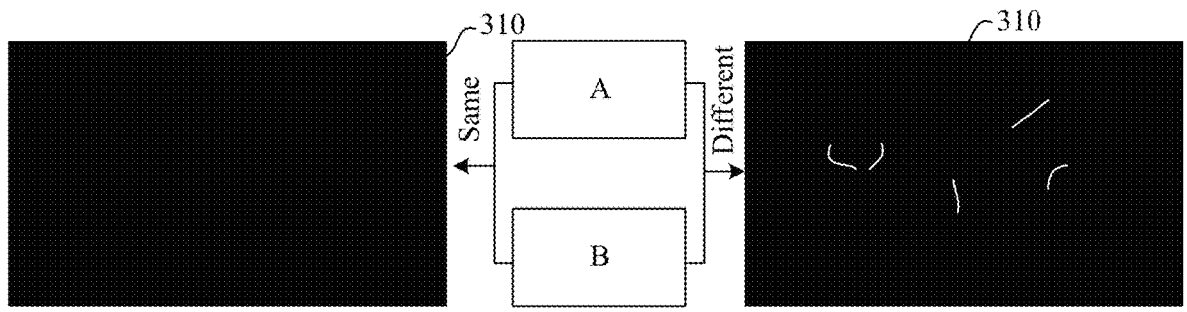
FIG. 3 is a schematic diagram of a difference image obtained by performing subtraction on two frames of images according to the embodiment shown in FIG. 2.

Schematically, FIG. 3 is a schematic diagram of difference images obtained by performing subtraction on same frames and on different frames according to an exemplary embodiment of this application. As shown in FIG. 3, a difference image 310 obtained by performing subtraction on the same frames are a full black image, and a difference image 320 obtained by performing subtraction on different frames has bright points. Because there may be a difference in display brightness or other aspects between two frames of images due to an acquisition time difference, the same frames involved in the embodiments of this application are two frames between which difference points cannot be told by naked eyes, and are not two frames that are exactly the same.

In the embodiments of this application, grayscale processing is performed on a color image, to obtain a grayscale image. An RGB value of each pixel in the color image is converted into a grayscale value according to a formula, to obtain the grayscale image corresponding to the color image. Visually, the grayscale image is a black and white image. Schematically, the formula used for converting color into grayscale is shown in the foregoing formula 1.

Step 204: Determine, according to grayscale values of the pixels in the grayscale image, whether a lag occurs from the first image frame to the second image frame in the running process of the application.

In an embodiment, a difference between the first image frame and the second image frame has a positive correlation with grayscale values in the grayscale image, that is, larger grayscale values in the grayscale image indicates a larger difference between the first image frame and the second image frame, so that it may be determined that a lag situation does not occur between the first image frame and the second image frame. Similarly, in response to that smaller grayscale values in the grayscale image indicate a smaller difference between the first image frame and the second image frame, when a maximum grayscale value in the grayscale image is less than a preset threshold, it is determined that a lag situation occurs between the first image frame and the second image frame.

In an embodiment, a lag situation between the first image frame and the second image frame is determined according to a maximum grayscale value in the grayscale image. Alternatively, a lag situation between the first image frame and the second image frame is determined according to a mean grayscale value in the grayscale image.

The foregoing two cases are respectively described. 1. In the solution in which whether a lag situation occurs is determined according to a maximum grayscale value, it is found according to experiments that for two image frames between which a difference cannot be told by naked eyes, the maximum grayscale value usually does not exceed 40. However, for two image frames between which a difference can be told, there is a large amount of grayscale values exceeding 40. Therefore, a maximum grayscale value in the grayscale image is determined, and when the maximum grayscale value is not greater than a preset threshold (for example, 40), it is determined that a lag occurs between the first image frame and the second image frame, which conforms to an association relationship between a difference degree between two image frames and grayscale values. 2. In the solution in which whether a lag situation occurs is determined by using a mean grayscale value, when inaccurate pixel values of one or a plurality of pixels are caused due to an error in a computing process of image frames, a problem of missed detection is easy to occur by using the foregoing maximum grayscale value, that is, there is a lag situation that cannot be detected. However, if a mean grayscale value is used, that is, when the mean grayscale value is less than the preset threshold, it indicates that an overall similarity between the two image frames is relatively high, and even if there is a difference between pixels due to a computing error, and the difference between the two image frames cannot be told by naked eyes, a lag situation between the two image frames can still be detected, which improves the accuracy of lag detection.

Schematically, a maximum grayscale value is determined from the grayscale image for pixels, and in response to that the maximum grayscale value is less than a grayscale value threshold, it is determined that there is a lag between the first image frame and the second image frame.

In conclusion, according to the lag detection method provided in this embodiment, a difference image between two image frames in a process video is converted into a grayscale image, and a lag situation between the two image frames is determined by using the grayscale image, so that the lag situation can be determined without the need of obtaining an FPS value in a running process of a terminal application. To be specific, a lag situation may be accurately determined for a cloud application such as a cloud game, which improves the accuracy of lag detection and the adaptability of the detection process.

The lag detection method provided in this embodiment is applied to a cloud game. Even if in a running process of the cloud game, there is a lag in a video stream of a game scene caused by a lag generated in a cloud server, a lag situation may be determined by using a difference degree between two image frames, thereby avoiding a problem that a lag situation in a process of the cloud game cannot be detected because there is a lag in a game video stream generated by the cloud server, while the terminal smoothly plays back the video stream.

Figure 4:
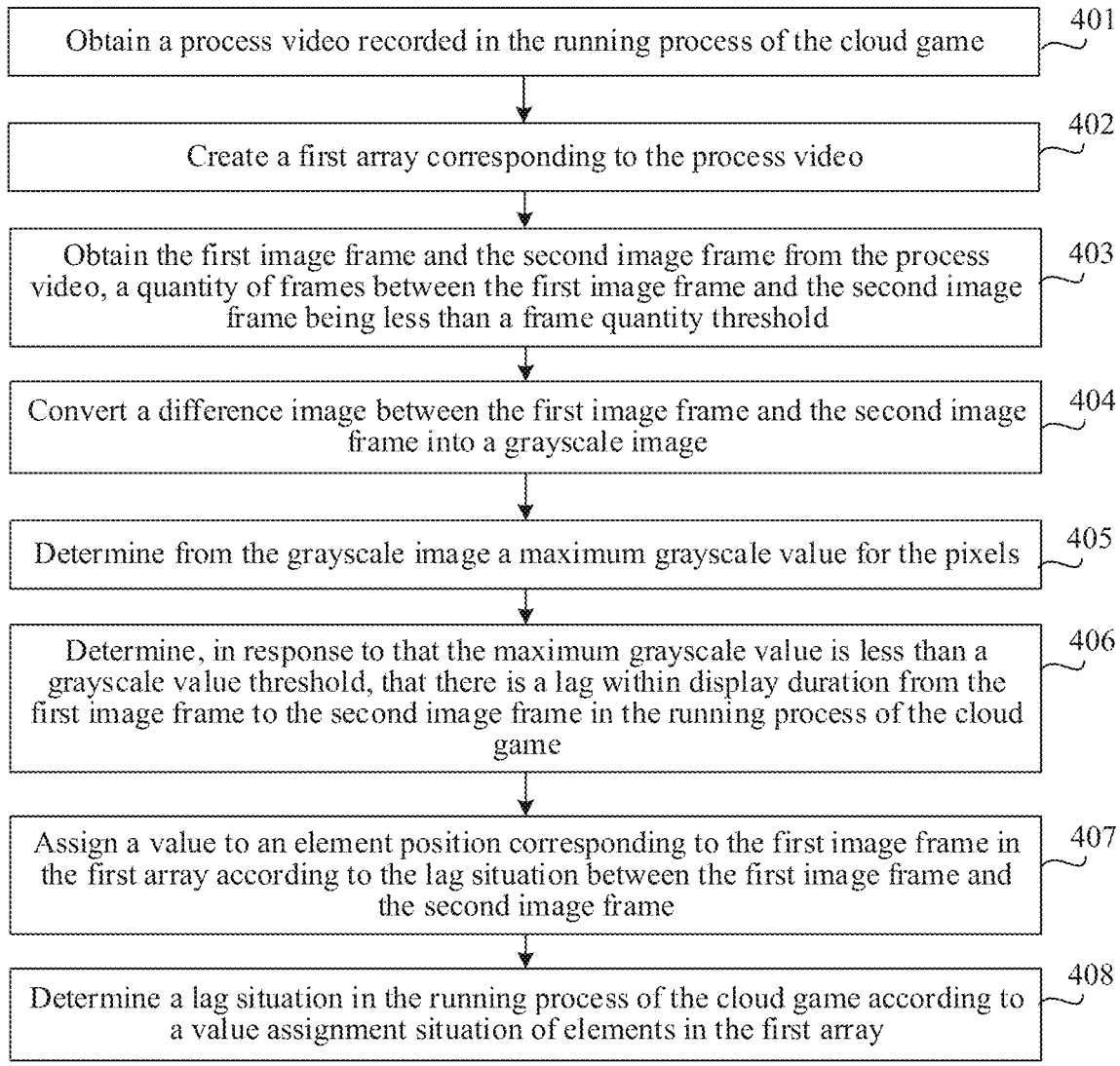
FIG. 4 is a flowchart of a lag detection method according to another exemplary embodiment of this application.

In an embodiment, lag situations occurred in the process video are recorded by creating a first array. FIG. 4 is a flowchart of a lag detection method according to another exemplary embodiment of this application. An example in which the method is applied to a server is used for description. As shown in FIG. 4, the method includes:

Step 401: Obtain a process video recorded in a running process of a cloud game.

In the embodiments of this application, a game application is used as an example for description, that is, a process video is recorded in a running process of the game application.

Step 402: Create a first array corresponding to the process video.

In an embodiment, the first array is used for recording lag situations corresponding to image frames. In an embodiment, an example in which lag detection is performed on the process video frame by frame is used for description. To be specific, the first image frame and the second image frame are adjacent frames in the process video, and assuming that the first image frame is played before the second image frame, when value assignment is performed on elements in the first array, and lag detection is performed on the first image frame and the second image frame, a value is assigned to an element corresponding to the first image frame according to a lag situation.

In the manner in which value assignment is performed on array elements in the first array, lag situations in the process video may be intuitively obtained according to distribution of element values in the first array, which improves the efficiency of lag detection.

Step 403: Obtain the first image frame and the second image frame from the process video, a quantity of frames between the first image frame and the second image frame being less than a frame quantity threshold.

In an embodiment, a selection manner of the first image frame and the second image frame includes at least one of the following manners:

First, the first image frame and the second image frame are two adjacent frames in the process video.

Second, the first image frame and the second image frame are two image frames spaced n frames apart in the process video, n being a positive integer.

Third, the first image frame and the second image frame are two adjacent key frames in the process video.

Step 404: Convert a difference image between the first image frame and the second image frame into a grayscale image.

In an embodiment, subtraction is first performed on the first image frame and the second image frame, to obtain a difference image. In this case, the difference image is expressed in a color form. For example, the difference image is an RGB image. Each pixel corresponds to an RGB value, and grayscale processing is performed on the difference image, to obtain a grayscale image corresponding to the difference image.

Step 405: Determine from the grayscale image a maximum grayscale value for the pixels.

In an embodiment, the grayscale image corresponds to a grayscale value matrix, and a maximum grayscale value is obtained from the grayscale value matrix by using an argmax interface of an extension program library (NumPy).

Relatively mature interfaces in OpenCV and NumPy are used, and only simple matrix operation is involved. Therefore, it takes about 0.01 s to process two 2340*1080 images in the foregoing manner, which has a high computing speed.

Step 406: Determine, in response to that the maximum grayscale value is less than a grayscale value threshold, that there is a lag within display duration from the first image frame to the second image frame in the running process of the cloud game.

In an embodiment, in response to that the maximum grayscale value is less than a threshold, it is determined that there is a lag between the first image frame and the second image frame.

In an embodiment, it is found according to experiments that for two image frames between which a difference cannot be told by naked eyes, the maximum grayscale value usually does not exceed 40. However, for two image frames between which a difference can be told, there is a large amount of grayscale values exceeding 40.

Figure 5:
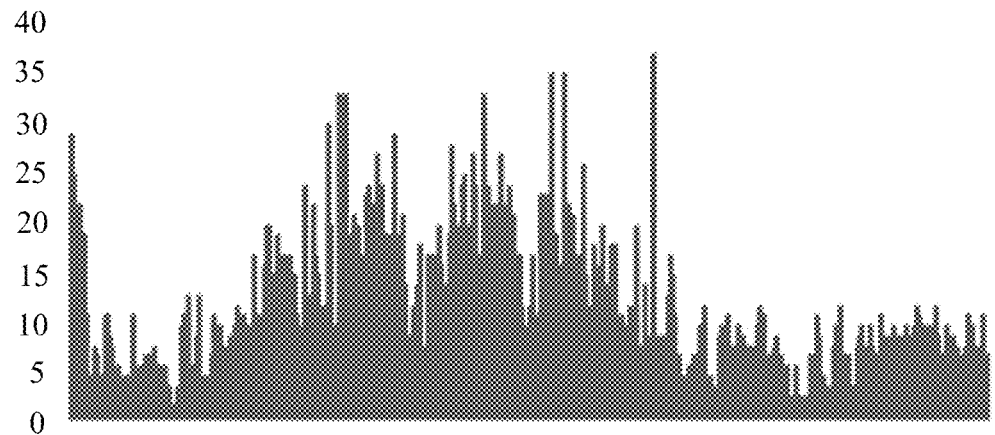
FIG. 5 is an image histogram of a grayscale image corresponding to two image frames between which a difference cannot be told by naked eyes according to the embodiment shown in FIG. 4.
Figure 6:
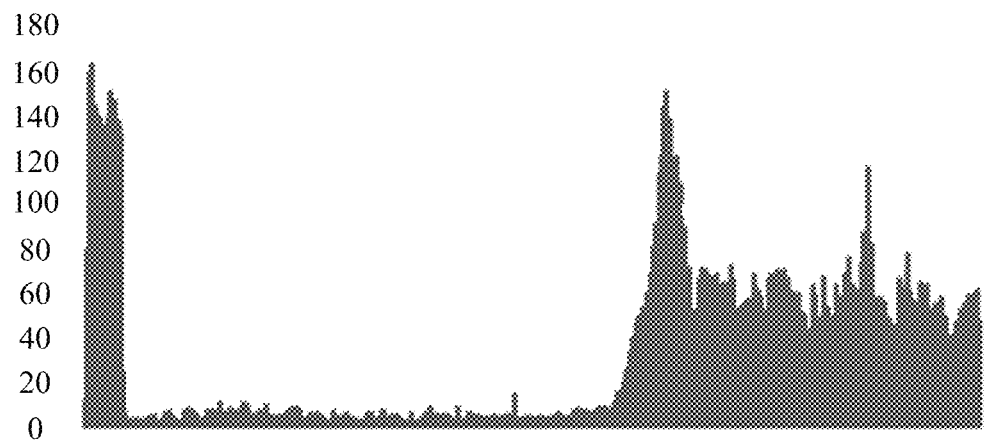
FIG. 6 is an image histogram of a grayscale image corresponding to two image frames between which a difference can be told by naked eyes according to the embodiment shown in FIG. 4.

Schematically, FIG. 5 is an image histogram 510 of a grayscale image corresponding to two image frames between which a difference cannot be told by naked eyes. As shown in FIG. 5, in the image histogram 510, grayscale values of pixels in the grayscale image are all less than 40. FIG. 6 is an image histogram 610 of a grayscale image corresponding to two image frames between which a difference can be told by naked eyes. As shown in FIG. 6, in the image histogram 610, most of grayscale values of pixels in the grayscale image exceed 40.

Schematically, if the grayscale value threshold is set to 40, in response to that the maximum grayscale value is less than 40, it is determined that there is a lag between the first image frame and the second image frame.

That the grayscale value threshold is 40 is merely a schematic example, and the grayscale value threshold may further be adjusted according to actual distribution of the grayscale values, for example, adjusted to 35, 50, or the like.

In an embodiment, in response to that the maximum grayscale value reaches the grayscale value threshold, it is determined that there is no lag between the first image frame and the second image frame.

Step 407: Assign a value to an element corresponding to the first image frame in the first array according to a determination of whether the lag occurs between the first image frame and the second image frame.

In an embodiment, a first value is assigned to the element corresponding to the first image frame in the first array in response to that there is a lag between the first image frame and the second image frame; and a second value is assigned to the element corresponding to the first image frame in the first array in response to that there is no lag between the first image frame and the second image frame.

Schematically, 0 is assigned to the element corresponding to the first image frame in the first array in response to that there is a lag between the first image frame and the second image frame, and 1 is assigned to the element corresponding to the first image frame in the first array in response to that there is no lag between the first image frame and the second image frame.

Schematically, lag detection is performed on an image frame 1 and an image frame 2 in the process video. To be specific, a difference image between the image frame 1 and the image frame 2 is determined, grayscale processing is performed on the difference image, to obtain a grayscale image, and a lag situation is determined according to a maximum grayscale value in the grayscale image. For example, the grayscale value threshold is 40. When the maximum grayscale value in the grayscale image is 80, it is determined that there is no lag situation between the image frame 1 and the image frame 2, and 1 is assigned to an element corresponding to the image frame 1 in the first array. When the maximum grayscale value in the grayscale image is 30, it is determined that there is a lag situation between the image frame 1 and the image frame 2, and 0 is assigned to the element corresponding to the image frame 1 in the first array.

Step 408: Determine a lag situation in the running process of the cloud game according to value assignments of elements in the first array.

In an embodiment, an example in which the first value is 0 and the second value is 1 is used for description. In an ideal situation, that is, there is no lag in the running process of the cloud game, a sum of k continuous elements in the first array is to be k, where k is a positive integer. Schematically, a sum of any 30 elements in the first array is to be 30. When a sum of 30 continuous elements is less than a threshold 15, it indicates that there is an obvious lag problem. Alternatively, if three continuous elements are all the first value, it may also indicate that there is an obvious lag problem.

In conclusion, according to the lag detection method provided in this embodiment, a difference image between two image frames in a process video is converted into a grayscale image, and a lag situation between the two image frames is determined by using the grayscale image, so that the lag situation can be determined without the need of obtaining an FPS value in a running process of a terminal application. To be specific, a lag situation may be accurately determined for a cloud application such as a cloud game, which improves the accuracy of lag detection and the adaptability of the detection process.

According to the method provided in this embodiment, a first array is created, and a value is assigned to an element according to a lag situation between the first image frame and the second image frame in the first array, so that after traversing performed on the image frames in the process video is completed, a lag situation of the entire process video is determined according to values of elements in the first array, thereby determining the lag situation in the running process of the application, which improves the accuracy and adaptability of lag detection.

In this solution, a tested party does not need to be intruded, only screen recording needs to be performed in the running process, and there is no requirement on a terminal type, which is easy to operate and has an accurate lag detection effect.

Figure 7:
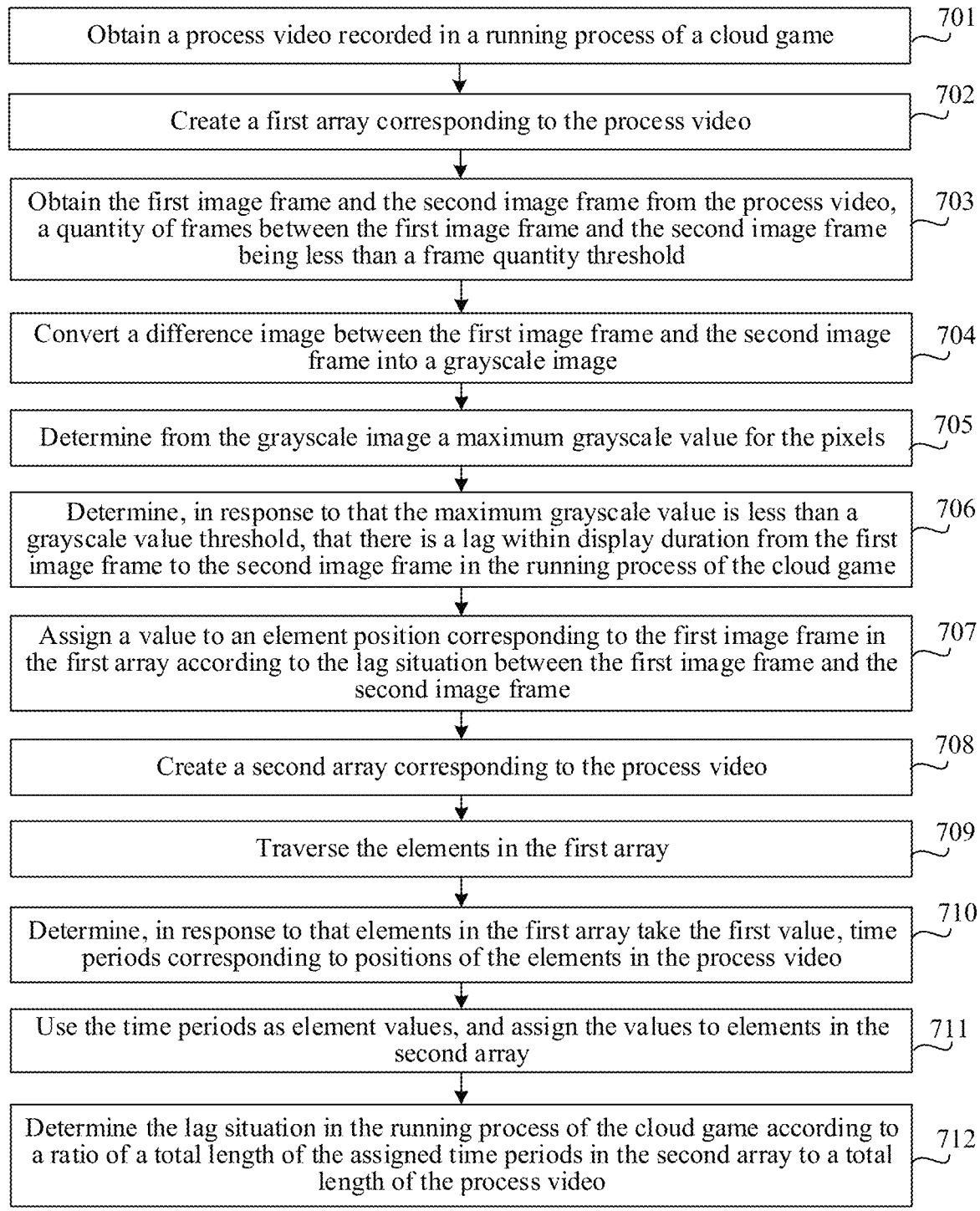
FIG. 7 is a flowchart of a lag detection method according to another exemplary embodiment of this application.

In one embodiment, the lag situation in the running process of the cloud game is determined in a manner of creating a second array. FIG. 7 is a flowchart of a lag detection method according to another exemplary embodiment of this application. An example in which the method is applied to a server is used for description. As shown in FIG. 7, the method includes:

Step 701: Obtain a process video recorded in a running process of a cloud game.

In the embodiments of this application, a game application is used as an example for description, that is, a process video is recorded in a running process of the game application.

Step 702: Create a first array corresponding to the process video.

In an embodiment, the first array is used for recording lag situations corresponding to image frames.

Step 703: Obtain the first image frame and the second image frame from the process video, a quantity of frames between the first image frame and the second image frame being less than a frame quantity threshold.

In an embodiment, a selection manner of the first image frame and the second image frame includes at least one of the following manners:

First, the first image frame and the second image frame are two adjacent frames in the process video.

Second, the first image frame and the second image frame are two image frames spaced n frames apart in the process video, n being a positive integer.

Third, the first image frame and the second image frame are two adjacent key frames in the process video.

Step 704: Convert a difference image between the first image frame and the second image frame into a grayscale image.

In an embodiment, subtraction is first performed on the first image frame and the second image frame, to obtain a difference image. In this case, the difference image is expressed in a color form. For example, the difference image is an RGB image. Each pixel corresponds to an RGB value, and grayscale processing is performed on the difference image, to obtain a grayscale image corresponding to the difference image.

Step 705: Determine from the grayscale image a maximum grayscale value for the pixels.

Step 706: Determine, in response to that the maximum grayscale value is less than a grayscale value threshold, that there is a lag within display duration from the first image frame to the second image frame in the running process of the cloud game.

In an embodiment, in response to that the maximum grayscale value is less than a threshold, it is determined that there is a lag between the first image frame and the second image frame.

Schematically, if the grayscale value threshold is set to 40, in response to that the maximum grayscale value is less than 40, it is determined that there is a lag within display duration from the first image frame to the second image frame in the running process of the cloud game.

In an embodiment, in response to that the maximum grayscale value reaches the grayscale value threshold, it is determined that there is no lag within display duration from the first image frame to the second image frame in the running process of the cloud game.

Step 707: Assign a value to an element corresponding to the first image frame in the first array according to a determination of whether the lag occurs between the first image frame and the second image frame.

In an embodiment, a first value is assigned to the element corresponding to the first image frame in the first array in response to that there is a lag between the first image frame and the second image frame; and a second value is assigned to the element corresponding to the first image frame in the first array in response to that there is no lag between the first image frame and the second image frame.

Step 708: Create a second array corresponding to the process video.

In an embodiment, the second array is used for recording time periods in which lags appear in the process video. That is, when a lag situation appears in the process video, time periods in which lags appear are recorded in the second array, so that after recording is completed, a ratio of time periods in which lags appear in the process video to total duration may be intuitively determined by using the second array, to determine the frequency at which a lag appears in the running process of the cloud game.

Schematically, an example in which the time period is implemented as a second-level unit is used for description, and therefore, the second array is used for recording which seconds at which lags appear in the process video. In an embodiment, the second array is used for determining, according to elements recorded as having a lag situation in the first array, time periods in which lags appear.

Step 709: Traverse the elements in the first array.

In an embodiment, the elements are sequentially extracted from the first array to perform lag situation detection. In an embodiment, each element in the first array is used for indicating whether a lag situation appears in a corresponding image frame. For example, if the first element in the first array is 1, it indicates that there is no lag situation in a first image frame relative to the second image frame. If the second element in the first array is 0, it indicates that there is a lag situation in the second image frame relative to a third image frame.

Step 710: Determine, in response to that elements in the first array take the first value, time periods corresponding to positions of the elements in the process video.

In an embodiment, a subscript of an element in the first array indicates a position of a frame in the process video. For example, if the subscript is 10, it indicates that an image frame corresponding to the element is the $10^{th}$ frame. Schematically, an example in which the process video is recorded at 30 FPS is used. The subscript of the element is divided by 30, to obtain a corresponding video second. When the second exists in the second array, further determination is not performed, and traversing continues to be performed. In an embodiment, because time periods in which lags appear in the process video need to be recorded in the second array, other lag situations at the recorded time periods do not need to be recorded again, avoiding repeated operations of recording lags for element values, thereby improving the generation efficiency of the second array.

When an element value is the second value, it indicates that there is no lag, and traversing continues to be performed. When the element value is the first value, it indicates that there is a lag, and whether a sum of 30 elements after the current element is greater than a threshold is determined. When the sum is less than the threshold, it indicates that there is an obvious lag, and a second corresponding to the current element is added into the second array. When the sum of the 30 elements reaches the threshold, whether two adjacent elements before and after the current element are the first value continues to be determined. When both the two elements before and after are the first value, it indicates that a lag caused by at least three continuous same image frames occurs, and a second corresponding to the current element is added into the second array.

Step 711: Use the time periods as element values, and assign the values to elements in the second array.

In an embodiment, after the time periods are used as elements to perform value assignment, values of elements in the second array intuitively show time periods in which lag situations occur in the process video. For example, if element values in the second array are respectively 2, 3, 5, 9, 10, and 16, it indicates that lag situations occur at the 2nd second, the 3rd second, the 5th second, the 9th second, the 10th second, and the 16th second in the process video, and lag duration and lag time points are determined according to a quantity of the elements, thereby improves the detection efficiency of the lag situation of the cloud game.

Step 712: Determine the lag situation in the running process of the cloud game according to a ratio of a total length of the assigned time periods in the second array to a total length of the process video.

In an embodiment, the lag situation in a running process of an application includes at least one of a same frame ratio, a quantity of lags, lag duration, lag time points. The same frame ratio is computed by using the following formula 2.

$$\text{same frame ratio}=(1-b/a)*100\% \qquad \text{Formula 2:}$$

a indicates a length of the first array, and b indicates a sum of elements in the first array.

The quantity of lags is determined by using a quantity of elements that take the first value in the first array. The lag duration and the lag time points are determined by using the second array.

In conclusion, according to the lag detection method provided in this embodiment, a difference image between two image frames in a process video is converted into a grayscale image, and a lag situation between the two image frames is determined by using the grayscale image, so that the lag situation can be determined without the need of obtaining an FPS value in a running process of a terminal application. To be specific, a lag situation may be accurately determined for a cloud application such as a cloud game, which improves the accuracy of lag detection and the adaptability of the detection process.

In the method provided in this embodiment, traversing is performed on the first array, elements indicating that lags occur in image frames are obtained from the first array, and seconds corresponding to the lags are recorded in the second array, so as to analyze a specific situation of lags, which increases data amount of lag analysis.

Figure 8:
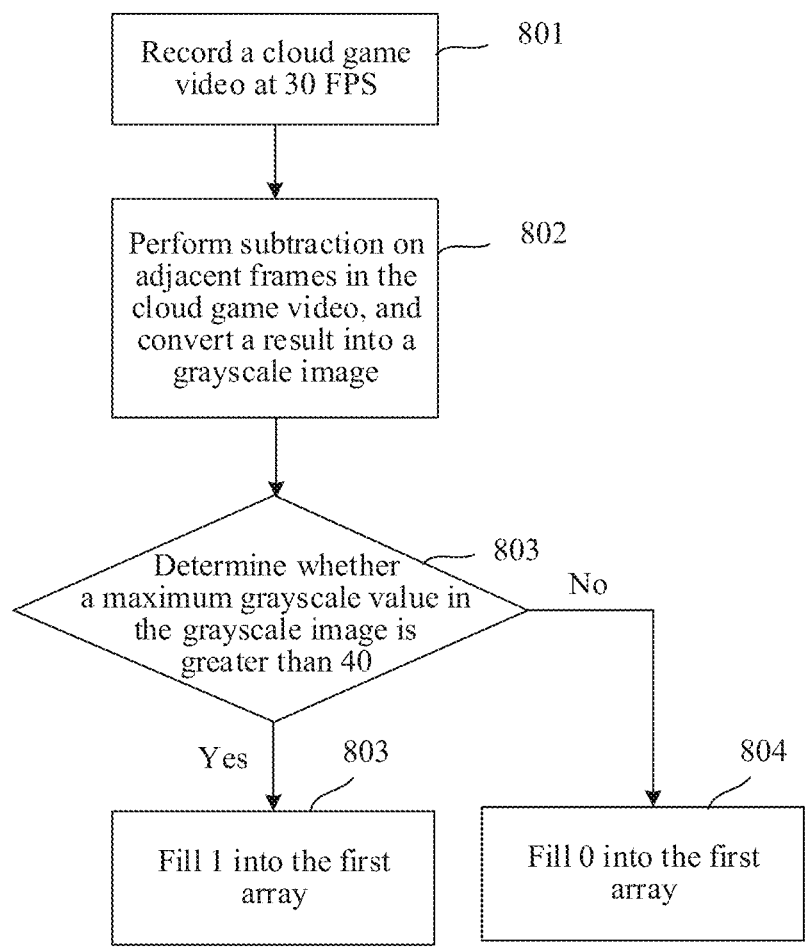
FIG. 8 is a flowchart of the entire solution of filling elements into a first array according to an exemplary embodiment of this application.

Schematically, FIG. 8 is a flowchart of the entire solution of filling elements into a first array according to an exemplary embodiment of this application. An example in which the method provided in this embodiment is applied to a cloud game is used for description. As shown in FIG. 8, the process includes:

Step 801: Record a cloud game video at 30 FPS.

In an embodiment, a video in the game process is recorded in a running process of the cloud game, and is used for performing lag detection.

Step 802: Perform subtraction on adjacent frames in the cloud game video, and convert a result into a grayscale image.

In an embodiment, subtraction is performed on element value matrices of adjacent frames, to obtain an element value matrix of a difference image, and grayscale processing is performed on element values in the element value matrix of the difference image, to convert the difference image into a grayscale image.

Step 803: Determine whether a maximum grayscale value in the grayscale image is greater than 40.

It is found according to experiments that for two image frames between which a difference cannot be told by naked eyes, the maximum grayscale value usually does not exceed 40. However, for two image frames between which a difference can be told, there is a large amount of grayscale values exceeding 40. Therefore, 40 is used as a grayscale value threshold.

Step 804: Fill 1 into the first array when the maximum grayscale value is greater than 40.

In an embodiment, when 1 is assigned to an element value, it indicates that there is a difference between image frames, that is, there is no lag situation between the image frames.

Step 805: Fill 0 into the first array when the maximum grayscale value is not greater than 40.

In an embodiment, when 0 is assigned to an element value, it indicates that there is a relatively small difference between image frames, that is, there is a lag situation between the image frames.

Figure 9:
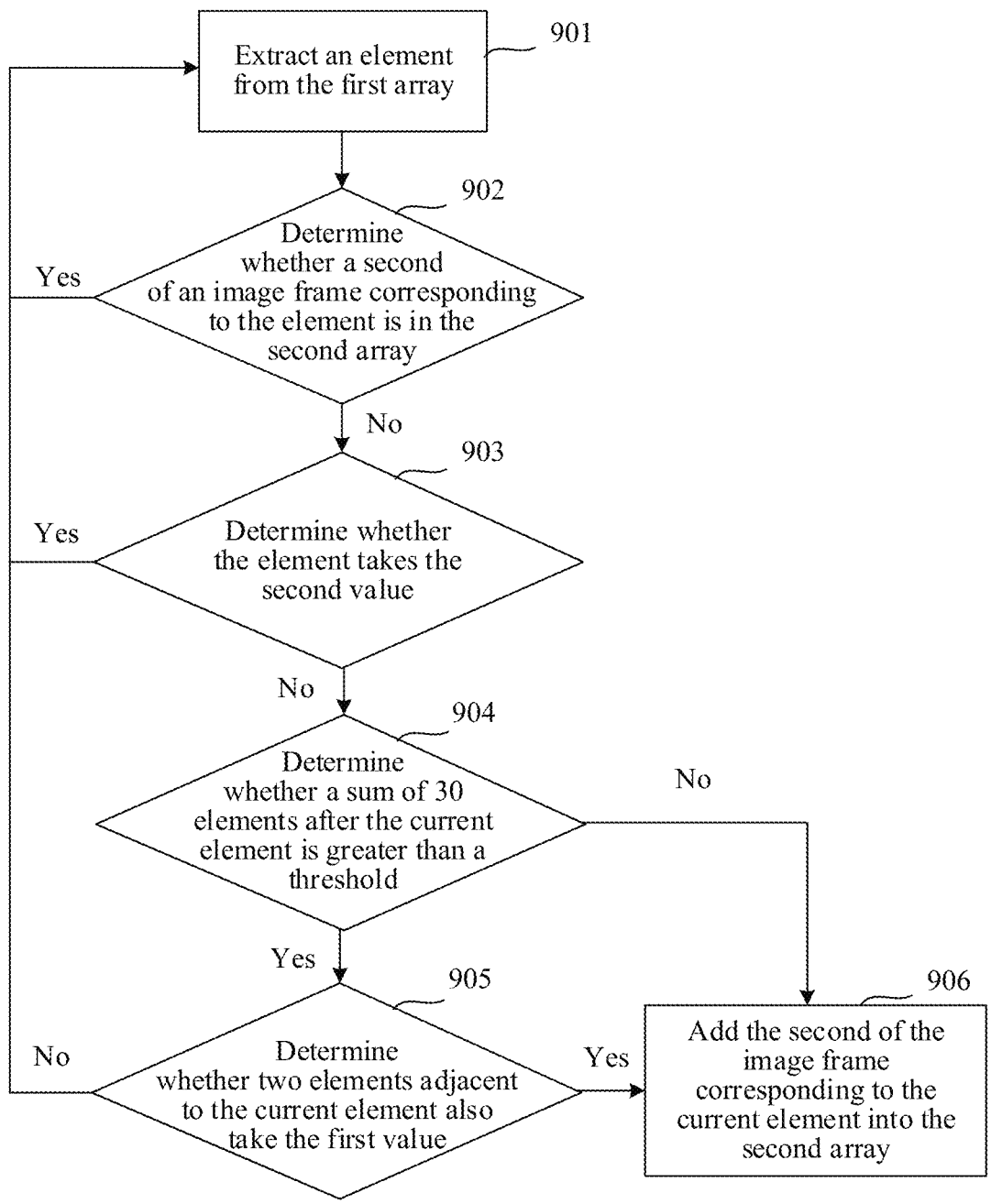
FIG. 9 is a flowchart of the entire solution of filling elements into a second array according to an exemplary embodiment of this application.

Schematically, FIG. 9 is a flowchart of the entire solution of filling elements into a second array according to an exemplary embodiment of this application. As shown in FIG. 9, the process includes:

Step 901: Extract an element from the first array.

In an embodiment, elements in the first array are traversed.

Step 902: Determine whether a second of an image frame corresponding to the element is in the second array.

When the second of the image frame corresponding to the element is in the second array, it indicates that it has determined that there is a lag at this second, and detection does not need to be performed again.

Step 903: Determine, when the second is not in the second array, whether the element takes the second value.

In an embodiment, the second value indicates that there is a difference between the image frame corresponding to the current element and another image frame during lag detection, so that there is no lag situation.

Step 904: Determine, when the element takes the first value, whether a sum of 30 elements after the current element is greater than a threshold.

In an embodiment, when the sum of the 30 elements is not greater than the threshold, it indicates that the lag situation is relatively obvious, and the second of the image frame corresponding to the current element is added into the second array.

Step 905: Determine, when the sum of the elements is greater than the threshold, whether two elements adjacent to the current element also take the first value.

Step 906: Add the second of the image frame corresponding to the current element into the second array when both the two elements take the first value.

In conclusion, according to the lag detection method provided in this embodiment, a difference image between two image frames in a process video is converted into a grayscale image, and a lag situation between the two image frames is determined by using the grayscale image, so that the lag situation can be determined without the need of obtaining an FPS value in a running process of a terminal application. To be specific, a lag situation may be accurately determined for a cloud application such as a cloud game, which improves the accuracy of lag detection and the adaptability of the detection process.

Figure 10:
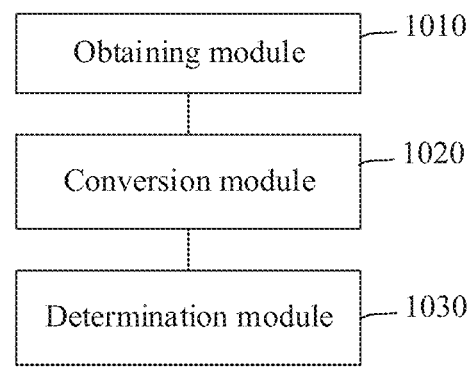
FIG. 10 is a structural block diagram of a lag detection apparatus according to an exemplary embodiment of this application.

FIG. 10 is a structural block diagram of a lag detection apparatus according to an exemplary embodiment of this application. As shown in FIG. 10, the apparatus includes:

an obtaining module 1010, configured to obtain a first image frame and a second image frame in a running process of a cloud game, the first image frame and the second image frame being image frames corresponding to a visual displayed in the running process of the cloud game;

the obtaining module 1010 being further configured to obtain a difference image between the first image frame and the second image frame, the difference image representing difference degrees between corresponding pixels in the first image frame and the second image frame;

a conversion module 1020, configured to convert the difference image into a grayscale image, the grayscale image including a plurality of pixels; and a determination module 1030, configured to determine, according to grayscale values of the pixels in the grayscale image, whether a lag occurs from the first image frame to the second image frame in the running process of the cloud game.

In one embodiment, the determination module 1030 is further configured to determine a first pixel value matrix corresponding to the first image frame and a second pixel value matrix corresponding to the second image frame.

The obtaining module 1010 is further configured to perform subtraction on the first pixel value matrix and the second pixel value matrix, to obtain the difference image, the difference image being represented by a difference matrix, the difference matrix including pixel difference values corresponding to the difference degrees between the pixels.

In one embodiment, the obtaining module 1010 is further configured to obtain the pixel difference values in the difference matrix corresponding to the difference image.

The conversion module 1020 is further configured to convert the pixel difference values into grayscale values, to obtain the grayscale image, the grayscale image being represented by a grayscale value matrix.

In one embodiment, the determination module 1030 is further configured to determine from the grayscale image a maximum grayscale value for the pixels.

The determination module 1030 is further configured to determine, in response to that the maximum grayscale value is less than a grayscale value threshold, that there is a lag within the display duration from the first image frame to the second image frame in the running process of the cloud game.

In one embodiment, the obtaining module 1010 is further configured to obtain a process video recorded in the running process of the cloud game; and obtain the first image frame and the second image frame from the process video, a quantity of frames between the first image frame and the second image frame being less than a frame quantity threshold.

Figure 11:
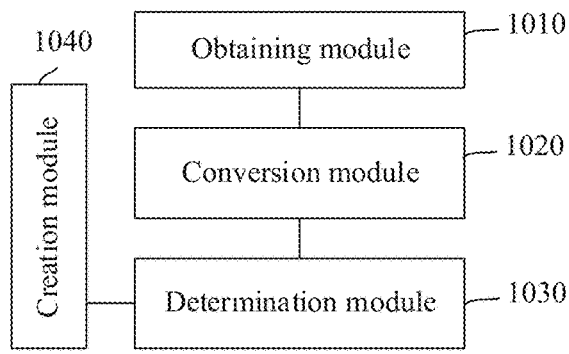
FIG. 11 is a structural block diagram of a lag detection apparatus according to another exemplary embodiment of this application.

In one embodiment, as shown in FIG. 11, the apparatus further includes:

a creation module 1040, configured to create a first array corresponding to the process video, the first array being used for recording lag situations corresponding to image frames;

the determination module 1030 being further configured to assign a value to an element corresponding to the first image frame in the first array according to a determination of whether the lag occurs between the first image frame and the second image frame; and the determination module 1030 being further configured to determine a lag situation in the running process of the cloud game according to value assignments of elements in the first array.

In one embodiment, the determination module 1030 is further configured to assign a first value to the element corresponding to the first image frame in the first array in response to that there is a lag between the first image frame and the second image frame.

The determination module 1030 is further configured to assign a second value to the element corresponding to the first image frame in the first array in response to that there is no lag between the first image frame and the second image frame.

In one embodiment, the creation module 1040 is further configured to create a second array corresponding to the process video, the second array being used for recording time periods in which lags appear in the process video.

The determination module 1030 is further configured to traverse the elements in the first array.

The determination module 1030 is further configured to determine, in response to that elements in the first array take the first value, time periods corresponding to positions of the elements in the process video.

The determination module 1030 is further configured to use the time periods as element values, and assign the values to elements in the second array; and determine the lag situation in the running process of the cloud game according to a ratio of a total length of the assigned time periods in the second array to a total length of the process video.

In conclusion, according to the lag detection apparatus provided in this embodiment, a difference image between two image frames in a process video is converted into a grayscale image, and a lag situation between the two image frames is determined by using the grayscale image, so that the lag situation can be determined without the need of obtaining an FPS value in a running process of a terminal application. To be specific, a lag situation may be accurately determined for a cloud application such as a cloud game, which improves the accuracy of lag detection and the adaptability of the detection process.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The lag detection apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the lag detection apparatus embodiments and the lag detection method embodiments provided in the foregoing embodiments belong to the same concept. For the specific implementation process, reference may be made to the method embodiments, and details are not described herein again.

Figure 12:
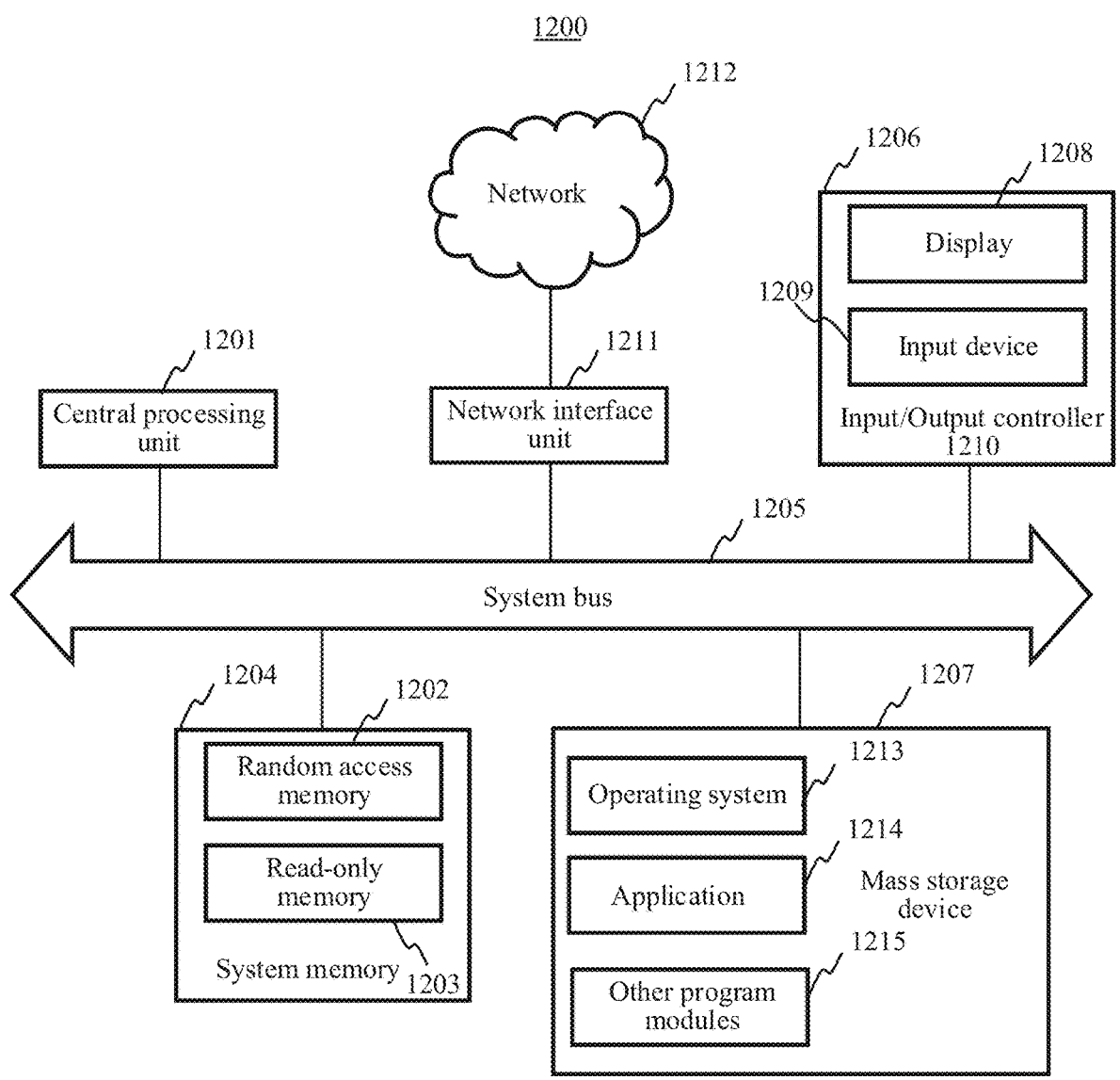
FIG. 12 is a structural block diagram of a terminal according to an exemplary embodiment of this application.

FIG. 12 is a schematic structural diagram of a server according to an exemplary embodiment of this application. Specifically, A server 1200 includes a central processing unit (CPU) 1201, a system memory 1204 including a random access memory (RAM) 1202 and a read only memory (ROM) 1203, and a system bus 1205 connecting the system memory 1204 to the CPU 1201. The server 1200 further includes a basic input/output (I/O) system 1206 assisting in transmitting information between devices in a computer, and a mass storage device 1207 configured to store an operating system 1213, an application program 1214, and another program module 1215.

The basic I/O system 1206 includes a display 1208 configured to display information and an input device 1209 such as a mouse or a keyboard configured to input information by a user. The display 1208 and the input device 1209 are both connected to the CPU 1201 by using an I/O controller 1210 that is connected to the system bus 1205. The basic I/O system 1206 may further include the input/output controller 1210 configured to receive and process input from a plurality of other devices such as a keyboard, a mouse, or an electronic stylus. Similarly, the input/output controller 1210 further provides an output to a display, a printer or another type of output device.

The mass storage device 1207 is connected to the CPU 1201 by using a mass storage controller (not shown) connected to the system bus 1205. The mass storage device 1207 and a computer-readable medium associated with the mass storage device 1207 provide non-volatile storage for the server 1200. That is, the mass storage device 1207 may include a computer-readable medium (not shown) such as a hard disk or a compact disc read only memory (CD-ROM) drive.

Generally, the computer-readable medium may include a computer storage medium and a communication medium. The computer storage medium includes volatile and nonvolatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art can know that the computer storage medium is not limited to the foregoing several types. The system memory 1204 and the mass storage device 1207 may be collectively referred to as a memory.

According to various embodiments of this application, the server 1200 may further be connected, by using a network such as the Internet, to a remote computer on the network and run. That is, the server 1200 may be connected to a network 1212 by using a network interface unit 1211 that is connected to the system bus 1205, or may be connected to a network of another type or a remote computer system (not shown) by using the network interface unit 1211.

The memory further includes one or more programs, which are stored in the memory and are configured to be executed by the CPU.

This application provides a computer-readable storage medium, storing at least one instruction, the at least one instruction, being loaded by a processor, to perform the lag detection method provided in the foregoing method embodiments.

This application further provides a computer program product, and the computer program product, when run on a computer, causes the computer to perform the lag detection method according to the foregoing method embodiments.

The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A lag detection method, performed by a computing device, the method comprising:
    obtaining a process video in a running process of an application;
    creating a first array associated with the process video, the first array comprising a plurality of first elements, wherein each first element corresponds to an image frame of the process video and is configured to record a lag situation of the corresponding image frame;
    determining lag situations corresponding to a plurality of first image frames from the process video and assigning values to the first elements that correspond to the first image frames in the first array, comprising: for a first image frame:
        obtaining the first image frame and a second image frame from the process video;
        obtaining a difference image between the first image frame and the second image frame, the difference image representing difference degrees between corresponding pixels in the first image frame and the second image frame;
        converting the difference image into a grayscale image, the grayscale image comprising a plurality of pixels;
        determining, according to grayscale values of the pixels in the grayscale image, whether a lag occurs within display duration from the first image frame to the second image frame in the running process of the application; and
        assigning a value to a first element corresponding to the first image frame in the first array according to a determination of whether the lag occurs between the first image frame and the second image frame; and
    determining a lag situation in the running process of the application based on a sum of k elements in the first array.

2. The method according to claim 1, wherein the obtaining a difference image between the first image frame and the second image frame comprises:
    determining a first pixel value matrix corresponding to the first image frame and a second pixel value matrix corresponding to the second image frame; and
    performing subtraction on the first pixel value matrix and the second pixel value matrix, to obtain the difference image, the difference image being represented by a difference matrix, the difference matrix comprising pixel difference values corresponding to the difference degrees between the pixels.

3. The method according to claim 2, wherein the converting the difference image into a grayscale image comprises:
    obtaining the pixel difference values in the difference matrix corresponding to the difference image; and
    converting the pixel difference values into the grayscale values, to obtain the grayscale image, the grayscale image being represented by a grayscale value matrix.

4. The method according to claim 1, wherein the determining, according to grayscale values of the pixels in the grayscale image, whether a lag occurs within display duration from the first image frame to the second image frame in the running process of the application comprises:
  determining, from the grayscale values of the grayscale image, a maximum grayscale value; and
  determining, in response to that the maximum grayscale value is less than a grayscale value threshold, that there is a lag within the display duration from the first image frame to the second image frame in the running process of the application.

5. The method according to claim 1, wherein
  a quantity of frames between the first image frame and the second image frame is being less than a frame quantity threshold.

6. The method according to claim 1, wherein the assigning a value to an element corresponding to the first image frame in the first array according to a determination of whether the lag occurs between the first image frame and the second image frame comprises:
  assigning a first value to the element corresponding to the first image frame in the first array in response to that there is a lag between the first image frame and the second image frame; and
  assigning a second value to the element corresponding to the first image frame in the first array in response to that there is no lag between the first image frame and the second image frame.

7. The method according to claim 6, wherein the determining a lag situation in the running process of the application according to value assignments of elements in the first array comprises:
  creating a second array corresponding to the process video, the second array being used for recording time periods in which lags appear in the process video;
  traversing the elements in the first array;
  determining, in response to that elements in the first array being the first value, time periods corresponding to the elements in the process video;
  assigning values to elements in the second array, the assigned values being the corresponding time periods; and
  determining the lag situation in the running process of the application according to a ratio of a total length of the assigned time periods in the second array to a total length of the process video.

8. The method according to claim 1, wherein the application is one of the following: a cloud game application, a real-time video application, and a navigation application.

9. The method according to claim 1, wherein determining the lag situation in the running process of the application comprises:
  determining the sum of k continuous elements in the first array;
  determining the lag situation based on a comparison between the sum and a threshold.

10. A lag detection apparatus, comprising at least one memory and at least one processor coupled to the at least one memory, the at least one processor being configured to:
  obtain a process video in a running process of an application;
  create a first array associated with the process video, the first array comprising a plurality of first elements, wherein each first element corresponds to an image frame of the process video and is configured to record a lag situation of the corresponding image frame;
  determine lag situations corresponding to a plurality of first image frames from the process video and assigning values to the first elements that correspond to the first image frames in the first array, comprising: for a first image frame:
    obtaining the first image frame and a second image frame from the process video;
    obtaining a difference image between the first image frame and the second image frame, the difference image representing difference degrees between corresponding pixels in the first image frame and the second image frame;
    converting the difference image into a grayscale image, the grayscale image comprising a plurality of pixels;
    determining, according to grayscale values of the pixels in the grayscale image, whether a lag occurs from the first image frame to the second image frame in the running process of the application; and
    assign a value to a first element corresponding to the first image frame in the first array according to a determination of whether the lag occurs between the first image frame and the second image frame; and
  determine a lag situation in the running process of the application based on a sum of k elements in the first array.

11. The apparatus according to claim 10, wherein the at least one processor is further configured to:
  determine a first pixel value matrix corresponding to the first image frame and a second pixel value matrix corresponding to the second image frame; and
  perform subtraction on the first pixel value matrix and the second pixel value matrix, to obtain the difference image, the difference image being represented by a difference matrix, the difference matrix comprising pixel difference values corresponding to the difference degrees between the pixels.

12. The apparatus according to claim 11, wherein the at least one processor is further configured to:
  obtain the pixel difference values in the difference matrix corresponding to the difference image; and
  convert the pixel difference values into grayscale values, to obtain the grayscale image, the grayscale image being represented by a grayscale value matrix.

13. The apparatus according to claim 10, wherein the at least one processor is further configured to:
  determine, from the grayscale values of the grayscale image, a maximum grayscale value; and
  determine, in response to that the maximum grayscale value is less than a grayscale value threshold, that there is a lag within the display duration from the first image frame to the second image frame in the running process of the application.

14. The apparatus according to claim 10, wherein
  a quantity of frames between the first image frame and the second image frame is less than a frame quantity threshold.

15. The apparatus according to claim 10, wherein the at least one processor is further configured to:
  assign a first value to the element corresponding to the first image frame in the first array in response to that there is a lag between the first image frame and the second image frame; and
  assign a second value to the element corresponding to the first image frame in the first array in response to that there is no lag between the first image frame and the second image frame.

16. The apparatus according to claim 15, wherein the at least one processor is further configured to:
   create a second array corresponding to the process video, the second array being used for recording time periods in which lags appear in the process video;
   traverse the elements in the first array;
   determine, in response to that elements in the first array being the first value, time periods corresponding to the elements in the process video;
   assign values to elements in the second array, the assigned values being the corresponding time periods; and
   determine the lag situation in the running process of the application according to a ratio of a total length of the assigned time periods in the second array to a total length of the process video.

17. The apparatus according to claim 10, wherein the application is one of the following: a cloud game application, a real-time video application, and a navigation application.

18. A non-transitory computer-readable storage medium, storing at least one instruction, at least one program, a code set, or an instruction set, the at least one instruction, the at least one program, the code set, or the instruction set, when being loaded by at least one processor, causing the at least one processor to perform a plurality of operations comprising:
   obtaining a process video in a running process of an application;
   creating a first array associated with the process video, the first array comprising a plurality of first elements, wherein each first element corresponds to an image frame of the process video and is configured to record a lag situation of the corresponding image frame;
   determining lag situations corresponding to a plurality of first image frames from the process video and assigning values to the first elements that correspond to the first image frames in the first array, comprising: for a first image frame:
      obtaining the first image frame and a second image frame from the process video;
      obtaining a difference image between the first image frame and the second image frame, the difference image representing difference degrees between corresponding pixels in the first image frame and the second image frame;
      converting the difference image into a grayscale image, the grayscale image comprising a plurality of pixels;
      determining, according to grayscale values of the pixels in the grayscale image, whether a lag occurs within display duration from the first image frame to the second image frame in the running process of the application; and
      assigning a value to a first element corresponding to the first image frame in the first array according to a determination of whether the lag occurs between the first image frame and the second image frame; and
   determining a lag situation in the running process of the application according to value assignments of the first elements in the first array, comprising:
      determining time periods in which lags appear in the process video based on the value assignments of the first elements in the first array; and
      determining the lag situation based on the time periods in which lags appear and a total duration of the process video.

19. The storage medium according to claim 18, wherein the obtaining a difference image between the first image frame and the second image frame comprises:
   determining a first pixel value matrix corresponding to the first image frame and a second pixel value matrix corresponding to the second image frame; and
   performing subtraction on the first pixel value matrix and the second pixel value matrix, to obtain the difference image, the difference image being represented by a difference matrix, the difference matrix comprising pixel difference values corresponding to the difference degrees between the pixels.

20. The storage medium according to claim 18, wherein determining the lag situation in the running process of the application further comprises:
   determining a ratio of the time periods in which lags appear in the process video to the total duration of the process video; and
   determining the lag situation based on the ratio.

* * * * *